United States Patent [19]

Lovette, Jr,

[11] 4,025,990

[45] May 31, 1977

[54] PROCESS FOR RECLAIMING RUBBER, METAL AND FABRIC FROM WHOLE TIRES

[75] Inventor: Norris G. Lovette, Jr,, Breinigsville, Pa.

[73] Assignee: Air Products and Chemicals, Inc., Allentown, Pa.

[22] Filed: Apr. 28, 1976

[21] Appl. No.: 681,016

Related U.S. Application Data

[63] Continuation-in-part of Ser. No. 605,029, Aug. 15, 1975, abandoned.

[52] U.S. Cl. .................................. 241/14; 241/18; 241/23; 241/24; 241/DIG. 31; 241/DIG. 37
[51] Int. Cl.² ........................................ B02C 21/00
[58] Field of Search ................. 241/14, 17, 23, 24, 241/29, DIG. 31, DIG. 37

[56] References Cited
UNITED STATES PATENTS

| | | | |
|---|---|---|---|
| 2,462,645 | 2/1949 | Knowland | 241/24 |
| 2,471,043 | 5/1949 | Schenck | 241/14 |
| 3,384,309 | 5/1968 | Marshall | 241/14 |
| 3,718,284 | 2/1973 | Richardson | 241/23 |
| 3,749,322 | 7/1973 | Reynolds | 241/14 |
| 3,885,744 | 5/1975 | Drage | 241/29 |

Primary Examiner—Granville Y. Custer, Jr.
Attorney, Agent, or Firm—Russell L. Brewer; Barry Moyerman

[57] ABSTRACT

Scrap tires containing magnetic components and non-magnetic rubber and cord components are cooled in a cryogenic freezer to the embrittlement temperature, comminuted in a comminution device and passed through a series of screening and density classification operations followed by magnetic material separation and further cryogenic size reduction to produce a product rubber crumb having a particle size of about 1/20 inch or less.

9 Claims, 1 Drawing Figure

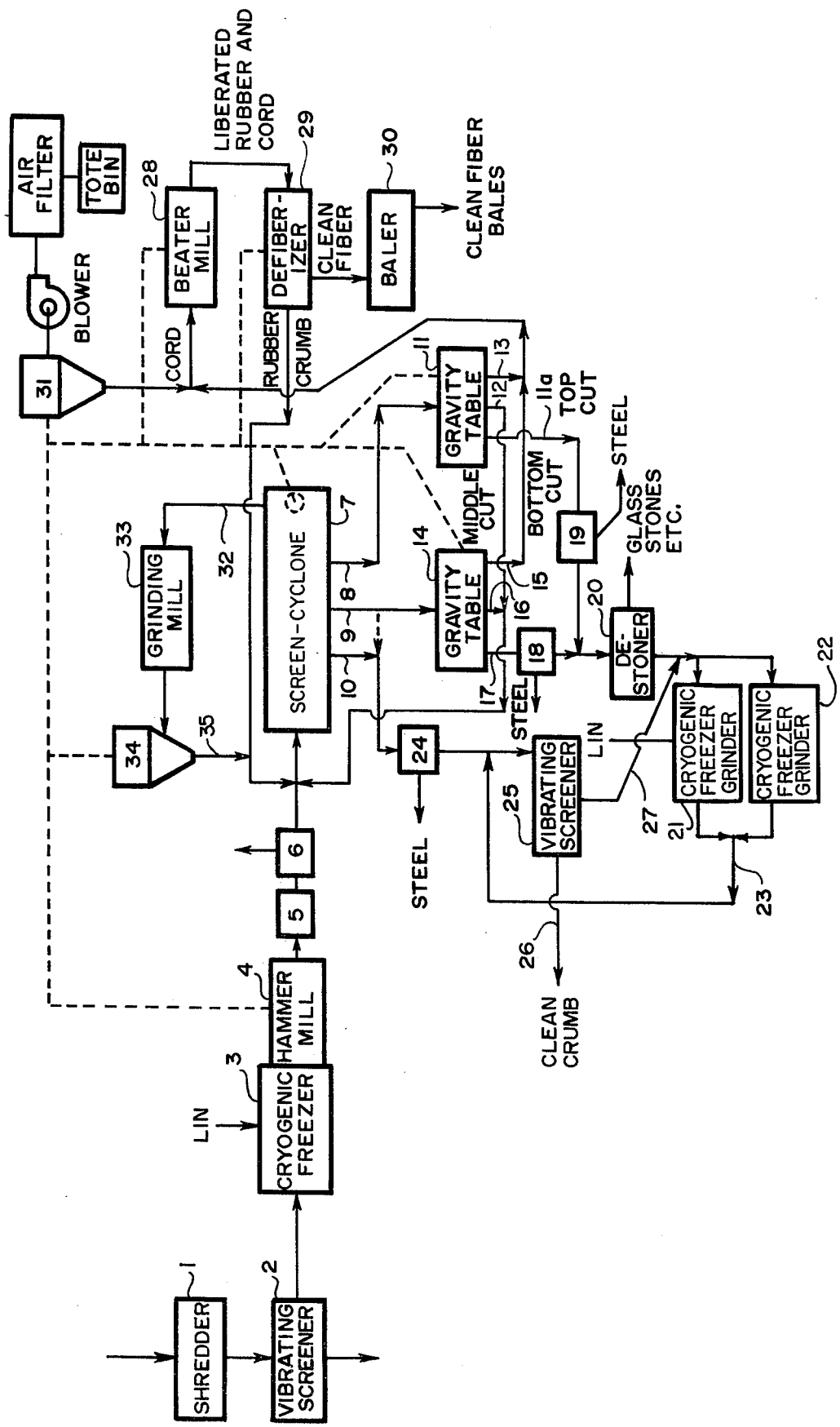

PROCESS FOR RECLAIMING RUBBER, METAL AND FABRIC FROM WHOLE TIRES

REFERENCE TO RELATED APPLICATIONS

This application is a continuation-in-part of U.S. Patent Application having U.S. Ser. No. 605,029 and a filing date of Aug. 15, 1975 now abandoned.

BACKGROUND OF THE INVENTION

Reclaiming processes for the recovery of rubber, tire cord and metal components having been available for some time. One of the primary reasons for the development of such processes has been to recover a substantial portion of the valuable components used in the manufacture of tires in a form for secondary use. Crumb rubber can be used as an additive to asphalt and paving compositions, as well as, an extender and impact modifier in rigid plastics. The metal products can be used in making low grade steel components, e.g. coat hangers and other wire products. The fabric recovered from tires can be used as a fuel source or as a filler.

A second factor providing the impetus for development of reclaiming processes for tires have been related to disposal. In years past, it was possible for junkyards and reclaiming plants to burn the tires and recover the metal or to dump them at a landfill, but such opportunities are being exhausted in today's environment. The States and the U.S. Government, through their Environmental Protection Agencies, have sought to eliminate this form of air and land pollution. The reclaiming of the components in tires inherently eliminates the problem of disposal and provides materials which can be converted into useful products.

DESCRIPTION OF THE PRIOR ART

In U.S. Pat. No. 2,471,043, there is disclosed a continuous process for reclaiming rubber from tires by cooling the tires with air to a temperature suited for crushing, then crushing the cooled tires to form particulate rubber particles mixed with magnetic components and tire cord. The magnetic components and tire cord are removed by mechanical separation.

In U.S. Pat. No. 3,718,284, there is disclosed a process for recovering rubber from tires by cooling using a liquefied refrigerant followed by grinding and size classification.

In Belgium Pat. No. 775,022, polymeric material is recovered from scrap by cryogenically cooling the scrap to a point of embrittlement, crushing, separating the magnetic component from the non-magnetic components and then sizing.

SUMMARY OF THE INVENTION

Briefly, this invention relates to a process for reclaiming rubber, fabric and metal components present in tires and particularly to the reclaiming of rubber in finely divided form which is essentially free of magnetic material. The process generally comprises cooling whole or shredded tire scrap in a cryogenic cooler to the embrittlement temperature, comminuting the cooled scrap forming rubber crumb, cord and a magnetic fraction and separating the magnetic fraction from the non-magnetic rubber crumb and cord fraction (which may contain residual magnetic components) in a first magnetic separator; separating the non-magnetic rubber and cord fraction in a first separating zone into at least a fine stream, an intermediate stream and a coarse stream; subjecting at least the intermediate stream to density separation by pneumatic fluidization for forming at least a light fraction and a heavy fraction; magnetically separating the residual magnetic components present in the heavy fraction from the nonmagnetic components, thereby forming a purified rubber fraction; subjecting the purified rubber fraction to a second size reduction by substantially simultaneous cryogenic freezing and grinding in a freezing-grinding zone to form purified fine rubber particles; and separating the purified fine rubber particles in a second separation zone to form crumb having a particle size of about 1/20 of an inch or less and a coarse fraction and recovering the crumb as product.

Advantages of this invention include:
the ability to produce a clean, finely divided rubber crumb in an efficient, economical manner for subsequent use;
the ability to process all types of scrap tires including steel belted radials;
the ability to provide magnetic components, e.g. iron and steel present in whole tires in a form free of rubber and other contaminants which can be utilized for subsequent use; and
the ability to form a purified tire cord essentially free of contaminating rubber and magnetic particles which can be used for subsequent processing.

THE DRAWINGS

FIG. 1 is a process flowsheet illustrating a preferred embodiment for reclaiming rubber and other components from whole tires.

DESCRIPTION OF THE PREFERRED EMBODIMENT

In referring to FIG. 1, whole tire scrap including automobile, truck, belted, steel belted, polyester cord, fiberglass, nylon, and plastic belted can be used as a raw material in practicing the invention. Often such tires have significant quantities of water, dirt and other foreign matter present and such contaminants can be present in the tire scrap.

Although whole tires can be processed, the whole tires generally are conveyed to shredder 1 where they are cut into pieces typically of about 2'' to 6''. After the tires have been shredded into relatively small pieces, they are conveyed to vibrating screener 2 for the purpose of removing at least a portion of the dirt and other contaminants present in the tire pieces. Air is passed upwardly through vibrating screener 2 to remove dirt and dust from the particles and to evaporate water or melt ice if any is present. The relatively dry particles then are passed to cryogenic freezer 3 for the purpose of cooling the pieces sufficiently to cause embrittlement of the rubber present in the tire scrap. Typically, the particles are cooled to a temperature of at least −50° F and preferably to at least −80° F to about −150° F. Such cooling causes the rubber to become frangible which then can be liberated from the metal bead and tire cord as small particles. Freezers suited for cooling the tire pieces generally operate by injecting or spraying a liquefied gas, e.g. liquefied nitrogen (L/N) into the freezer for effecting refrigeration.

The cooled tire pieces which are at a temperature of about −150° F as they leave the cryogenic freezer are conveyed to comminution device 4 for the purpose of liberating and pulverizing the rubber from the cord and metal components in the tire. Comminution device 4, e.g. a hammer mill is operated at sufficient velocity to crack and grind the rubber into particles having a size less than about ¾ of an inch. The wire segments and cord typically are reduced in length to about 2" or less.

The tire pieces after having been subjected to high impact in the hammer mill and forced through the hammer mill grates, are deposited on a conveyor as a thin layer and passed through a series of magnetic separators 5 and 6. The scrap is classified into a magnetic and non-magnetic fraction or more particularly, to a ferrous and non-ferrous fraction. Although two magnetic separators are shown, only one is necessary at this point provided that the magnetic separator is capable of classifying the magnetic and the non-magnetic fractions with desired effectiveness. Typically, the non-magnetic fraction as it leaves magnetic separators 5 and 6, comprises from about 2 to 12% fiber cord, 88 to 92% crumb rubber, and less than 1% steel. On the other hand, the magnetic fraction comprises about 99% of the steel present in the tires, less than about 1% of the rubber and from 25 to 75% of the fiber cord fraction. The magnetic fraction is conveyed to equipment not shown for conventional reclaiming. Typically, this involves burning the polymeric components from the magnetic fraction thereby leaving a purified metal product.

The non-magnetic fraction comprising the rubber, fiber cord, and a small amount of ferrous fraction is conveyed to screening deck 7 on screen cyclone 7 incorporating air elutriation means, e.g. a cyclone separator, for size classification and for removing a portion of the fiber cord and dust. Screening deck 7 should have at least two screens, a scalping screen and a product screen. Typically, a three deck screener, as shown, having a first scalping screen with an opening of about ½", a second screen of about 8–12 mesh and a third product screen of about 18–22 mesh for forming a first overs fraction 32, a second overs fraction 8, a third overs 9 and a third bottoms 10 is employed.

Sometimes, depending upon the degree of freezing and grinding, it is acceptable to employ a screening deck employing one screen in addition to a scalping screen having a mesh size of from about 18–22. The overs from that screen can be treated in the same manner as the third overs fraction and the bottoms treated as the third bottoms fraction as will be discussed in the description of the drawing relating to a three screen operation.

Air elutriation means, e.g. cyclone separators, normally are incorporated into the operation of screening deck 7 in order to remove at least a portion of the dust and extremely light components, e.g. cord, from the classified product. To accomplish this, air is directed through the screens in screening deck or screen cyclone 7 to pick up dust and fabric and then to a cyclone separator (present in the screen cyclone unit). In this way at least a portion of the light fiber portion is removed from the heavier rubber portion.

In the screening operation, the first overs 32, obtained from a scalping screen, are large clumps, e.g. greater than ½ inch. These larger particles as a first overs 32 are reground in grinding mill 33 and passed through cyclone separator 34 forming a dust fraction (not identified) and heavies 35. The heavies 35 are returned to screening deck 7.

The second overs fraction 8 obtained from the second screener having a particle size less than about ½ inch and greater than about 8–10 mesh are further classified by density by passing the second overs fraction 8 over gravity table 11. A gravity table has an inclined vibrating screen and has air passing upwardly through it. The lighter particles flow down gravity table 11 and drop therefrom, while the heavier particles are held high on the screen. With proper control of air flow, a top cut 11a, a middle cut 12 and a bottom cut 13 are formed. Top cut 11a comprises the heavier crumb rubber particles which are held on the screen by the force of the air as it passes through the vibrating screen. Middle cut 12 is between top cut 11a and bottom cut 13 on the screen and comprises fiber cord with attached rubber and liberated rubber. Bottom cut 13 comprises the lighter fiber cords with a small portion of attached rubber. Bottoms cut 13 is sent to beater mill 28 or grinder 4 or grinding mill 33 if a beater is not used for stripping the fiber of rubber. Likewise if a gravity table such as gravity table 11 is not employed, then all of second overs fraction 8 is sent to beater mill 28 or grinding mill 33 for removal of rubber from the fiber and then returned to screening deck 7 for reprocessing. One of the advantages of using a gravity table at this stage is that it does permit a further classification with respect to density and minimizes the amount of material that must be returned for stripping of rubber. This saves energy and reduces the overall cost of reclaiming.

The third overs fraction 9 obtained from the third screen in screening deck 7 having a particle size of less than about 10 mesh and greater than about 20 mesh is removed from screening deck 7 and further classified by passing this fraction over a second gravity table 14. Three cuts are formed. The less dense or bottom fraction 15 is combined with bottoms cut 13 from gravity table 11 and sent to beater mill 28. Middle cut 16 is combined with middle cut 12 and recycled to the screening deck 7 for further size classification. Top cut 17, which comprises the more dense crumb rubber from gravity table 14, is passed through magnetic separator 18 for the purpose of removing any small ferrous components or other magnetic fractions not having been previously removed by magnetic separators 5 and 6, while top cut 11a is passed through magnetic separator 19.

It is important to effect a second magnetic separation of the top cuts 11a and 17 because this permits the removal of substantially all of the fine metallic components, e.g. about 1% remaining in the crumb after the material has passed magnetic separators 5 and 6. Often when the magnetic separation is conducted prior to establishing a fine cut stage, the larger rubber particles and fiber components interfere with the removal of the magnetic or ferrous fraction and leave greater quantities of metal in the product.

Top cut fractions 11a and 17, after leaving magnetic separators 18 and 19, are combined and passed through destoner 20. Destoner 20 relies on vacuum to separate the dense contaminants from the rubber fraction thereby removing glass, stones and other contaminants. The destoned material then is passed through a pair of cryogenic freezer-grinders 21 and 22 in order to effect further size reduction of the relatively clean rubber component with the product removed and combined as stream 23. The cryogenic freezers-grinders 21 and 22 effect a second size reduction in much the same manner as cryogenic freezer 3 in that the small rubber particles are cooled to the embrittlement temperature by introducing liquid nitrogen or other cryogenic fluid into the freezer and then impacting or crushing the embrittled rubber. The cryogenic freezer-grinders 21 and 22 differ from the first cryogenic freezer 3 and grinder 4 combination in that cooling is effected during grinding whereas in the first operation cooling is conducted prior to grinding. Because the particles of rubber are so small in the second operation, the heat generated makes the particles quite gummy and in the absence of a coolant size reduction would be virtually impossible.

Returning to screening deck 7, third bottoms fraction 10 having a particle size smaller than about 20 mesh is passed through magnetic separator 24. The non-magnetic fraction as it leaves magnetic separator 24 is combined with stream 23 and fed to vibrating screener 25 for final screening. Vibrating screener 25 has a screen of about a 20 mesh and preferably 30 mesh or smaller and results in forming an overs fraction 26 and a bottoms fraction 27. The bottoms fraction 26 is a clean, rubber crumb essentially free of fiber cord and any magnetic fraction, e.g. steel. This product can be packaged for reuse. Overs fraction 27 is combined with the discharge from destoner 20 for recycle into the cryogenic freezer-grinders.

As a separate embodiment in the process, bottoms cut 13 and bottoms cut 15 from gravity tables 11 and 14 can be conveyed to beater mill 28 which acts to liberate and dislodge rubber from the tire cord. As is known, these larger particles comprise rubber fiber or tire cord. With the rubber having been loosened or liberated from the tire cord in beater mill 28, the effluent from beater mill 28 is conveyed to defiberizer 29 which acts to separate the rubber from the cord. The crumb rubber is discharged from defiberizer 29 and returned to screening deck 7. The fiber cord fraction is discharged from defiberizer 29 and conveyed to baler 30 where the fiber cord is packaged as clean bales essentially free of rubber and magnetic components.

Optionally, in the process, an induced draft air stream can be used to remove dust and extremely light components from hammer mill 4, gravity tables 11 and 14, as well as the fiber reclaiming apparatus, namely, beater mill 28, defiberizer 29 and baler 30. The air is passed through cyclone separator 31 and filtered to remove submicron particles in order to prevent air pollution. The heavy particulates from the base of cyclone separator 31 are recycled to beater mill 28 for further processing or reclaiming of both rubber and fiber components.

The above description represents a complete process for the reclaiming of not only rubber components, but of magnetic or steel components and fiber components from whole tires with each component being essentially free of contaminating materials. It is understood that variations can be made in the process without detracting from the spirit of the invention.

What is claimed is:

1. A process for the recovery of components in tire scrap having magnetic components and non-magnetic cord and rubber components combined therein comprising the steps of:
   a. cooling the tire scrap in a first freezing zone to the embrittlement temperature;
   b. comminuting the cooled scrap in a first comminution zone to effect a first size reduction thereof;
   c. magnetically separating the discharge from the first comminuting zone into a magnetic fraction and a substantially non-magnetic rubber and cord fraction containing residual magnetic components;
   d. separating the non-magnetic rubber and cord fraction in a first separating zone into at least a fine stream, an intermediate stream and a coarse stream;
   e. subjecting at least the intermediate stream to density separation by pneumatic fluidization for forming at least a light fraction and a heavy fraction;
   f. magnetically separating the residual magnetic components present in the heavy fraction from the non-magnetic components, thereby forming a purified rubber fraction;
   g. subjecting the purified rubber fraction to a second size reduction by substantially simultaneous cryogenic freezing and grinding in a combined freezing-grinding zone to form purified fine rubber particles; and
   h. separating the purified fine rubber particles in a second separation zone to form crumb having a particle size of about 1/20 of an inch or less and a coarse fraction and recovering the crumb as product.

2. The process of claim 1 wherein the coarse stream from the first separating zone is impacted in a mill and returned to the first separating zone.

3. The process of claim 2 wherein the tire scrap is shredded prior to cooling in the first freezing zone.

4. The process of claim 3 wherein dust is removed from the first separating zone.

5. The process of claim 4 wherein the light fraction from the density separation is milled to loosen the rubber from the cord, the milled fraction defiberized to form a rubber and cord fraction, and the rubber fraction returned to the first separating zone.

6. The process of claim 5 wherein the coarse fraction from the second separation zone is recycled to the combined freezing-grinding zone.

7. The process of claim 6 wherein the purified rubber fractionation from step (f) is passed through a pneumatic separator for removing stones therefrom prior to the second size reduction.

8. The process of claim 7 wherein the density separation in step (e) results in the formation of a light fraction, a middle fraction and a heavy fraction, with the middle fraction being recycled to the first separation zone.

9. The process of claim 8 wherein:
   the first separation zone comprises at least three screens for forming a first overs, a second overs, a third overs and a third bottoms,
   the first overs being impacted in a mill and returned to the first separation zone,
   the second overs are passed through a magnetic separator for removing residual magnetic components from the non-magnetic components therein, with the magnetic components being combined with the purified fine rubber particles in step (h); and
   the third overs and the third bottoms processed in the manner described beginning with step (e).

* * * * *